United States Patent [19]

Hoppe

[11] 4,314,500

[45] Feb. 9, 1982

[54] INSTANTANEOUS OPENING POSITIVE LOCK MECHANISM

[75] Inventor: James C. Hoppe, Redondo Beach, Calif.

[73] Assignee: The United States of America as represented by the Secretary of the Air Force, Washington, D.C.

[21] Appl. No.: 115,514

[22] Filed: Jan. 25, 1980

[51] Int. Cl.³ .............................................. F42B 15/10
[52] U.S. Cl. ....................................... 89/1 B; 102/378; 188/67
[58] Field of Search ................... 188/67; 85/DIG. 1; 89/1 B, 1.5 F; 102/49.4, 49.5; 285/2, 33

[56] References Cited

U.S. PATENT DOCUMENTS 3,265,408  8/1966  Dickie ............................ 85/DIG. 1
3,404,649  10/1968  Valihora ....................... 102/49.5 X

FOREIGN PATENT DOCUMENTS 435508  9/1935  United Kingdom ................... 188/67

Primary Examiner—Ralph J. Hill
Attorney, Agent, or Firm—Donald J. Singer; Jacob N. Erlich

[57] ABSTRACT

An actuating rod is locked firmly in position by a split spring locking ring which engages matching shoulders in a groove on the rod. An electrical signal operates to energize a squib gas generator which produces pressure forcing a piston inward unlocking the ring and engaging wedge faces on the split locking ring causing the ring to spread open and release the actuating rod which moves upward in response to the forces of an extension spring. When locked, the rod has great resistance to imposed axial and side loads.

1 Claim, 5 Drawing Figures

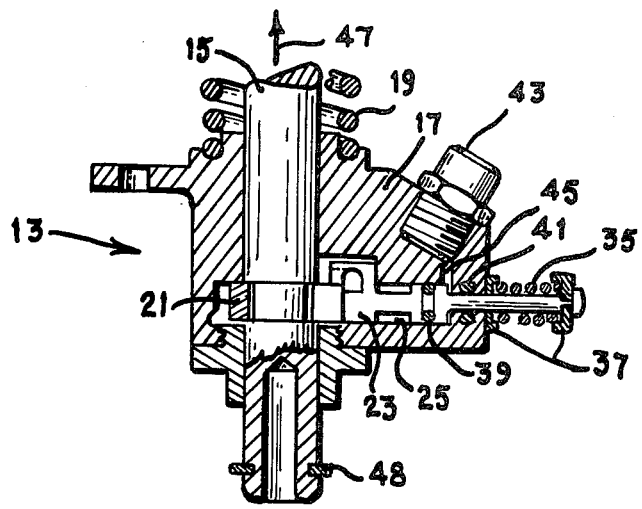
FIG. 1
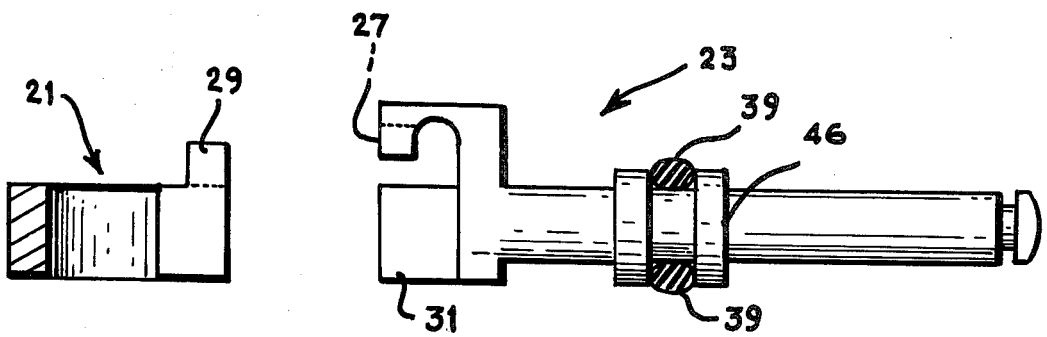
FIG. 3
FIG. 2
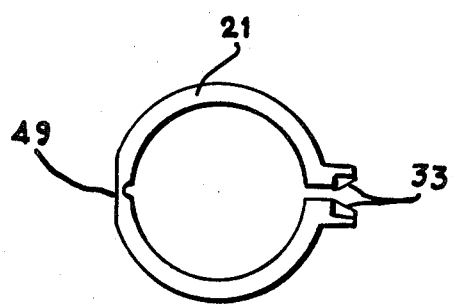
FIG. 5
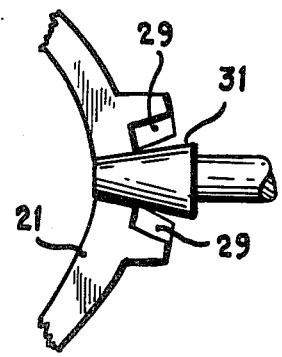
FIG. 4

INSTANTANEOUS OPENING POSITIVE LOCK MECHANISM

STATEMENT OF GOVERNMENT INTEREST

The invention described herein may be manufactured and used by or for the Government for governmental purposes without the payment of any royalty thereon.

BACKGROUND OF THE INVENTION

This invention relates to a positive lock mechanism having an instantaneous opening capabilty and, more particularly, the invention is concerned with providing a lock mechanism which includes a shaft with a circular groove with a split spring locking ring disposed circumferentially in the groove and a lock arrangement which holds the ring in the engaged position. Upon energization of a gas producing squib, a piston is driven inward, unlocking the locking ring and forcing it open to disengage the shaft and permit it to slide through the ring.

Heretofore, it has been common practice to provide two position gas operated locks for use as a space booster payload separating mechanism. The locks are either structurally engaged or open to permit separation which is generally accomplished by the force which disengages the lock mechanism. In a typical ball lock type mechanism, the time required to unlock the device is a function of the time needed to build up activation pressure within the body chamber and the distance the cam must move to release the balls. Although ball locks have the advantage of disengaging under load, they have the disadvantage of uneven bearing upon mating surfaces and point loading upon these and the camming surfaces which induces stress failures caused by the Brinelling effect on these surfaces. The point loading problem severely limits their load bearing capacity which is a requirement of the payload separating mechanism. While the use of balls incorporates a low friction disengagement surface, their capacity to resist shearing loads during engagement is disproportionately low compared to other elements of the lock and therefore the structural load bearing efficiency of this type is relatively low.

Another type of lock mechanism which is sometimes used as a space booster payload separating device is the explosive nut arrangement. The time required to unlock this device is that which is required to ignite the cartridge, generate gas pressure, move a locking piston, move a separator piston, expand the nut, move an ejector piston and drive the bolt clear of the mated surfaces. Explosive nut mechanisms have the advantage of providing good stress and tensile strength through engagement of bolt threads thereby committing a substantial amount of material to shear strength. However, they do require movement and travel for a number of parts which consumes time. Other disadvantages are that the bolt is not retained and that it must clear one-half of the structure in order to effect reliable separation. A system for retaining the loose bolt may be required where there is a possibility that it may impact fragile parts or jam other mechanisms.

Thus it can be seen that there is a definite need for a lock mechanism that is extremely fast acting and has great strength and rigidity in its locked position. Also, the lock should be extremely lightweight in relation to its load carrying capability while placing the locking materials in mechanical shear.

SUMMARY OF THE INVENTION

The present invention provides an instantaneous opening positive lock mechanism for use as a retention and separation device for missile reentry vehicles. An actuating rod is held firmly in position by a split spring locking ring which engages matching shoulders on the rod. Gas pressure from a squib gas generator forces a lock-unlock piston inward against its spring tension. The inner end of the piston is provided with an internal mortise groove and external wedging surfaces. The internal mortise groove engages a matching pair of mortise lugs on the locking ring holding it closed and engaged with the rod while the piston is being held back by its spring tension. Inward movement of the piston disengages these lugs, releasing the ring and engaging opposing matching wedge faces on the ring. As the piston moves inward, these faces force the ring open, disengaging the rod which then moves upward in response to the force of a main spring urging the rod upward.

Accordingly, it is an object of the invention to provide a positive lock mechanism wherein the unlock time is minimized because of the short travel of the unlocking mortise groove on the piston and the already engaged wedge of the piston with the matching wedge faces on the locking ring.

Another object of the invention is to provide an instantaneous opening positive locking mechanism wherein the rod is firmly held against loads in either axial direction by engagement of the shoulders on the rod with the split spring locking ring.

Still another object of the invention is to provide a positive lock mechanism wherein the displacement of the locked rod is resisted by the shear strength of the rod/lock ring materials resulting in excellent long-term size versus load bearing efficiency without metallurgical problems.

A further object of the invention is to provide a positive lock mechanism wherein the rod is spring loaded to impart a separation force and/or travel to the rod.

A still further object of the invention is to provide a positive lock mechanism wherein the locking ring is designed as a spring to assist in opening when released and impart a tension load upon the piston/lock-spreader insuring that it remains locked against vibration environments.

Another still further object of the invention is to provide a positive lock mechanism wherein the rod and locking ring can be designed to permit rotation of the rod while still maintaining the linear locked position.

These and other objects, features and advantages will become more apparent after considering the following detailed description taken in conjunction with the annexed drawings and appended claims.

BRIEF DESCRIPTION OF THE DRAWINGS

FIG. 1 is a view in partial cross section of an instantaneous opening positive lock mechanism according to the invention showing the device in the locked position with the piston cam in contact with the locking ring;

FIG. 2 is an enlarged side view of the piston cam showing the wedge cam inner end with the mortise groove thereabove;

FIG. 3 is a side view of the locking ring spring in partial section showing the upstanding mortise lugs which engage the mortise groove on the piston cam;

FIG. 4 is an enlarged top view of the spring ring with the piston wedge in section showing the ring in the opened release position after the piston has been driven inward by the force from the gas producing squib; and FIG. 5 is a top view of the locking spring ring in the closed position showing a thinned area at its maximum stress point to lower the force required to cause the ring to open.

DESCRIPTION OF A PREFERRED EMBODIMENT

Referring now to the drawings in which like reference numerals refer to like elements in the several views, in FIG. 1 there is shown a lock mechanism 13 which is particularly suited for use as a retention and separation device for missile reentry vehicles. The lock mechanism 13 is shown in the locked position with the actuating rod 15 held firmly in position until movement is needed. When locked, the rod 15 has great resistance to axial and side loads imposed. The rod 15 is disposed vertically in the body 17 for sliding movement therein. An extension spring 19 provides an upward force on the rod 15 when the rod 15 is in the unlocked position. A locking spring ring 21 (shown more clearly in FIGS. 3 and 5) is positioned between matching shoulders on the rod 15.

A piston cam 23 shown in FIG. 2 is adapted to move laterally through a cylinder 25 in the body 17. The inward end of the piston 23 includes an internal mortise groove 27 for engaging upstanding mortise lugs 29 on the locking ring 21. The inward end of the piston 23 also includes a wedge portion 31 which engages opposing wedge faces 33 on the locking ring 21. A piston spring 35 held in place by spring retainers 37 serves to hold the piston 23 back in the locked position. An O-ring seal 39 is positioned around the piston 23 to seal the piston 23 in the cylinder 25. Another O-ring 41 is positioned around the piston 23 to prevent gas pressure from escaping. A squib gas generator 43 provides the gas pressure necessary to pressurize the cylinder 25 behind the piston 23.

In operation, actuation begins with an electrical signal to the squib gas generator 43. Gas pressure from the squib 43 passes through the passageway 45 in the body 17 into the cylinder 25 behind the shoulder 46 on the piston 23 shown more clearly in FIG. 2. The inward end of the piston 23 with the internal mortise groove 27 and the external wedging surfaces 31 is held back in the locked position by the tension in the spring 35. In this position, the piston 23 engages the matching pair of mortise lugs 29 on the locking ring spring holding it shut in engagement with the rod 15. When the squib 43 pressurizes the cylinder 25, piston 23 starts to move inward causing the lugs 28 to become disengaged from the groove 27 thereby unlocking the ring 21 so that further inward movement of the piston 23 allows the wedge 31 to engage the surfaces 33 on the lock ring 21 causing the ring 21 to be forced open to release the rod 15 and allow upward movement in the direction of the arrow 47 under the force of the extension spring 19 until positively stopped by the snap ring 48 which acts as a collar on the rod 15. The piston wedge face 31 is provided with an integral stop so that it cannot penetrate too far and interfere with the upward movement of the rod 15. The locking ring 21 is thinned at its maximum stress point 49 to insure complete disengagement and to lower the force required to open and close it.

Although the invention has been illustrated in the accompanying drawings and described in the foregoing specification in terms of a preferred embodiment thereof, the invention is not limited to this embodiment or to the particular configuration mentioned. It will be apparent to those skilled in the art that my invention could have extensive use in other operations where it is desirable to provide a fast acting precision position holding lock mechanism having complete repeatability and full reliability where free rotation of the rod is possible while still maintaining linear lock conditions.

Having thus set forth and described the nature of my invention, what I claim and desire to secure by Letters Patent of the United States is:

1. An instantaneous opening positive lock mechanism comprising a body portion having a vertically oriented cylindrical opening therethrough, an actuating rod disposed in the cylindrical opening in said body portion for slidable movement therein, a circular groove around the circumference of said rod, a locking spring ring disposed in said circular groove for holding said rod in locked position in said body, a piston cam in alignment with said locking spring ring, said piston cam being positioned in a horizontally oriented cylindrical opening in said body portion for slidable movement therein, means on said piston cam for opening said ring when said piston cam is urged inward, said ring opening means including a wedge portion on the innermost end of said piston cam for engaging wedge faces on said locking spring ring whereby inward movement of said piston cam causes said ring to open and release said rod to allow vertical movement of said rod in response to forces acting thereon, and an internal mortise groove positioned on the innermost end of said piston cam, said mortise groove engaging upstanding mortise lugs on said locking ring to provide a positive locking capability and prevent opening of said locking ring until said piston cam is moved inward.

* * * * *